(12) United States Patent
Domlovil et al.

(10) Patent No.: US 8,303,028 B2
(45) Date of Patent: Nov. 6, 2012

(54) SLIDE RAIL FORCE DISTRIBUTION MEMBER

(75) Inventors: Thomas Jonathan Domlovil, Farmington Hills, MI (US); Naga Ananthachandra Narayana, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 49 days.

(21) Appl. No.: 13/011,313

(22) Filed: Jan. 21, 2011

(65) Prior Publication Data
US 2012/0187716 A1    Jul. 26, 2012

(51) Int. Cl.
*B60J 5/06* (2006.01)
(52) U.S. Cl. .................. 296/193.05; 296/155; 49/213; 49/360
(58) Field of Classification Search ............ 296/193.05, 296/155, 187.12, 146.9, 147, 148, 203.04, 296/29, 193.08, 149; 49/360, 425, 213, 49, 49/411, 221; 16/105
See application file for complete search history.

(56) References Cited

U.S. PATENT DOCUMENTS

| | | | |
|---|---|---|---|
| 4,152,872 A | 5/1979 | Tanizaki et al. | |
| 4,413,444 A | 11/1983 | Chikaraishi | |
| 4,560,197 A * | 12/1985 | Minami | 296/155 |
| 5,454,618 A * | 10/1995 | Sullivan | 296/97.22 |
| 6,112,470 A * | 9/2000 | Hashimoto et al. | 49/502 |
| 6,244,652 B1 | 6/2001 | Shoudou et al. | |
| 6,390,536 B2 | 5/2002 | Tsubokura et al. | |
| 6,776,450 B2 * | 8/2004 | Okubo et al. | 296/146.9 |
| 7,621,586 B2 * | 11/2009 | Fischer et al. | 296/155 |
| 8,007,028 B2 * | 8/2011 | Pencak et al. | 296/155 |
| 2009/0000200 A1 * | 1/2009 | Heuel et al. | 49/209 |
| 2011/0101733 A1 * | 5/2011 | Anderson et al. | 296/187.12 |

FOREIGN PATENT DOCUMENTS
JP        9317324 A      12/1997

* cited by examiner

*Primary Examiner* — Glenn Dayoan
*Assistant Examiner* — Sunsurraye Westbrook
(74) *Attorney, Agent, or Firm* — Young, Basile, Hanlon & McFarlane P.C.

(57) ABSTRACT

Disclosed herein are embodiments of vehicles and vehicle body assemblies incorporating slide rail reinforcements. One embodiment of a vehicle body assembly comprises an inner body panel and an outer body panel spaced a distance from the inner body panel in an outboard direction of a vehicle. The outer body panel has an outer surface and an opposing inner surface. An elongated slide track is mounted on the outer surface of the outer body panel. A force distribution member has a support surface fixed to the inner surface of the outer body panel directly opposite a portion of the elongated slide track and first and second distribution legs extending from the support surface and fixed to the inner body panel.

20 Claims, 3 Drawing Sheets

SLIDE RAIL FORCE DISTRIBUTION MEMBER

TECHNICAL FIELD

The present invention relates in general to a slide rail force distribution member for reinforcement of vehicle sliding doors.

BACKGROUND

Many larger vehicles such as vans or commercial trucks have side-mounted sliding doors. Sliding doors provide convenient and less obstructed access to the interior of the vehicle and are repeatedly opened and closed. Sliding doors typically utilize at least one slide rail mounted on an adjacent fixed body panel to which the door is connected. The slide rail supports the door and allows for opening and closing motion of the door. Since slide rails support the weight of a door, these mechanisms can experience forces during use of the door. For example, the slide rail and adjacent parts of the vehicle body experience forces when the door is opened, as the door typically strikes a hard stop if the door is fully opened. Additionally, if a sliding door is slammed open, the vehicle body can experience stresses in the area of the slide rail, risking increased wear and fatigue.

SUMMARY

Disclosed herein are embodiments of vehicles and vehicle body assemblies incorporating slide rail force distribution members. One embodiment of a vehicle body assembly comprises an inner body panel and an outer body panel spaced a distance from the inner body panel in an outboard direction of a vehicle. The outer body panel has an outer surface and an opposing inner surface. An elongated slide track is mounted on the outer surface of the outer body panel. A force distribution member having a support surface is fixed to the inner surface of the outer body panel directly opposite a portion of the elongated slide track and first and second distribution legs extending from the support surface and fixed to the inner body panel.

One embodiment of a vehicle disclosed herein comprises a slidable closure panel and a fixed body panel. The fixed body panel comprises an inner body panel and an outer body panel spaced a distance from the inner body panel in an outboard direction of the vehicle. The outer body panel has an outer surface and an opposing inner surface. An elongated slide track is mounted on the outer surface of the outer body panel and configured to support the slidable closure panel. A force distribution member is coupled between the inner and outer body panels and configured to transfer a force of the slidable closure panel from the outer body panel to the inner body panel.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
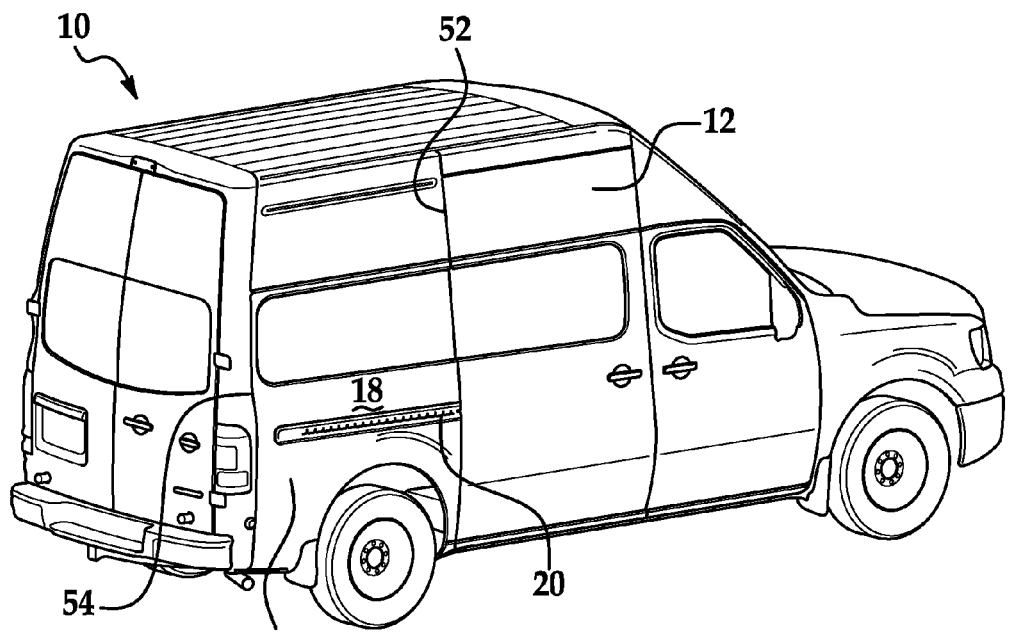
FIG. 1 is a perspective view of a vehicle with a slidable closure panel in a closed position.
Figure 2:
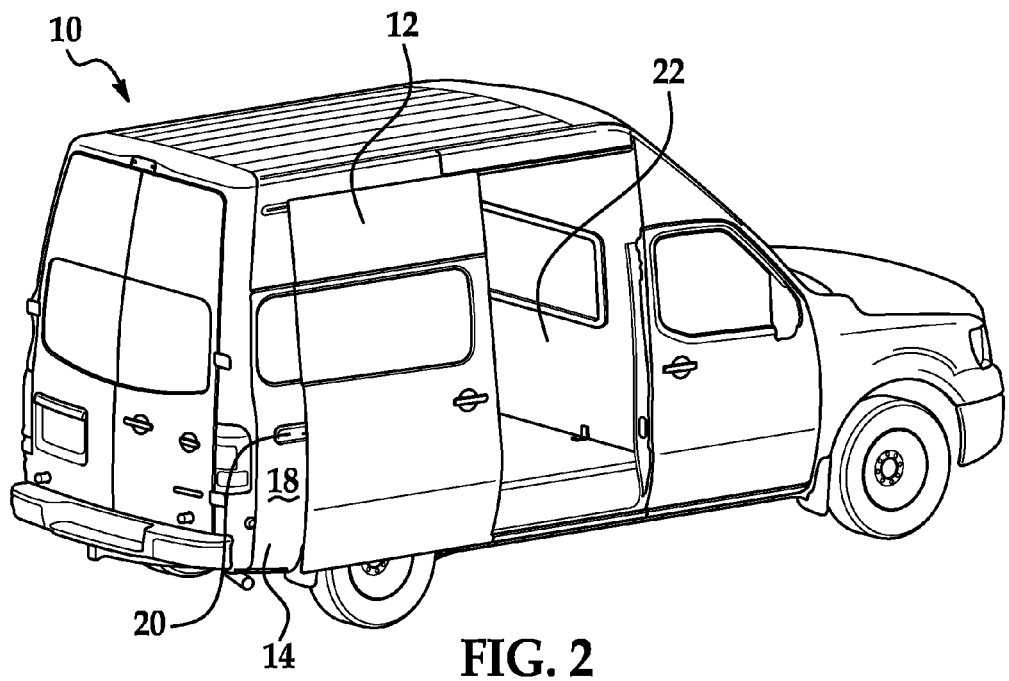
FIG. 2 is a perspective view of the vehicle in FIG. 1 with the slidable closure panel moved along a slide track to an open position.

FIG. 1 illustrates a vehicle 10 having a slidable closure panel 12 adjacent a fixed vehicle body panel 14. The fixed vehicle body panel 14 has an inner body panel 16 (shown in FIG. 3) and an outer body panel 18. The slidable closure panel 12 is opened by sliding the closure panel 12 along an elongated slide track 20 mounted on or formed in the outer body panel 18 of fixed body panel 14. FIG. 2 illustrates the slidable closure panel 12 in an opened position to provide access to the internal compartment 22 of the vehicle. The vehicle 10 shown is provided as illustration and is not meant to be limiting. Any vehicle equipped with a slidable closure panel or door on any one or more sides of the vehicle is within the purview of this disclosure. Additionally, sliding doors that move in non-horizontal directions are contemplated.

The elongated slide track 20 is mounted on the outer body panel 18 of the vehicle 10 as shown and typically supports much of the weight of the slidable closure panel 12 as it slides along the elongated slide track 20. The elongated slide track 20 is configured to support the slidable closure panel 12 by receiving a protrusion 23 (shown in FIG. 6) extending from an interior side of the slidable closure panel 12 that slides within the elongated slide track 20. The elongated slide track 20 guides movement of the closure panel 12 via the protrusion 23 relative to the outer body panel 18.

Figure 3:
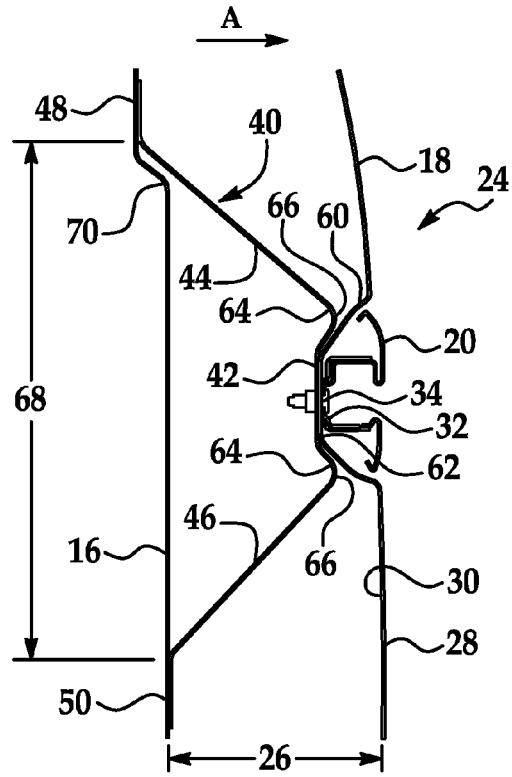
FIG. 3 is a side sectional view of a vehicle body assembly disclosed herein.

The elongated slide track 20 is essentially cantilevered and only attached to the outer body panel 18. To decrease or prevent excessive movement of the body panel 14 and other areas of the vehicle 10 which can result in vehicle body deformation, a vehicle body assembly 24 shown in FIG. 3 is disclosed. The vehicle body assembly 24 comprises the inner body panel 16 and the outer body panel 18 of the fixed vehicle body panel 14. The outer body panel 18 is spaced a distance 26 from the inner body panel 16 in an outboard direction of the vehicle 10. As used herein, outboard direction is the direction from the interior compartment 22 toward the exterior of the vehicle 10 and illustrated with arrow A.

The outer body panel 18 has an outer surface 28 and an opposing inner surface 30. The elongated slide track 20 is mounted on the outer surface 28 of the outer body panel 18. A force distribution member 40 is positioned between the inner and outer body panels 16 and 18, respectively. The force distribution member 40 has a support surface 42 fixed to the inner surface 30 of the outer body panel 18 directly opposite a portion 32 of the elongated slide track 20. A fastener 34 can be used to mount the elongated slide track 20 to the outer body panel 18. The same fastener 34 can also attach the support surface 42 of the force distribution member 40 to the outer body panel 18 opposite the portion 32 of the elongated slide track 20. The fastener 34 extends through apertures 36 in the elongated slide track 20, the outer body panel 18, and the support surface 42 of the force distribution member 40 to rigidly fix the force distribution member 40 to the elongated slide track 20. The fastener 34 is not limited to the type illustrated in the figures and can be embodied by any type of fastening means known to those skilled in the art, including welds or adhesives.

Figure 4:
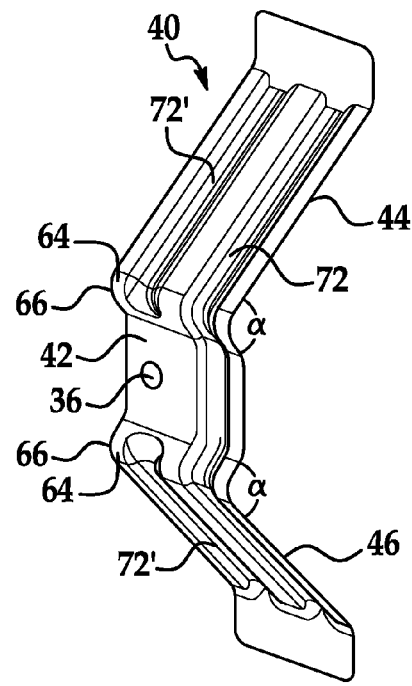
FIG. 4 is a perspective view of a force distribution member as disclosed herein.

The force distribution member 40 also has first and second distribution legs 44, 46 extending from the support surface 42 and fixed to the inner body panel 16. The first and second distribution legs 44 and 46, respectively, of the force distribution member 40 extend from the support surface 42 to span the distance 26 between the inner body panel 16 and outer body panel 18. The first and second distribution legs 44, 46 are fixed to the inner body panel 16 at first and second contact points 48, 50. The first and second distribution legs 44, 46 can be fixed to the inner body panel 16 using welds, adhesives, fasteners, or any other attachment means known to those skilled in the art. FIG. 4 is a perspective view of the force distribution member 40.

Figure 5:
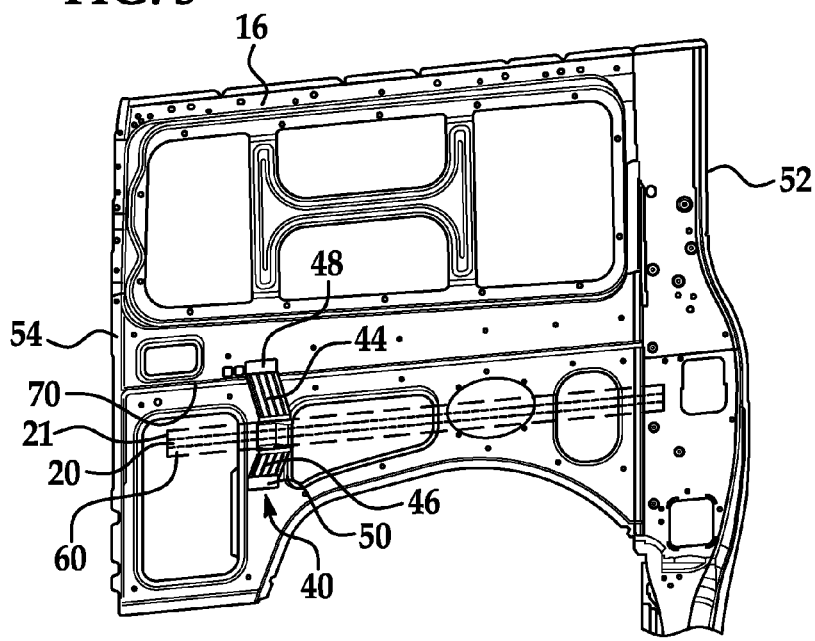
FIG. 5 is a perspective view of an inner body panel with a relative position of the slide track illustrated in broken line.

The fixed body panel 14 has a forward edge 52 and an opposing rear edge 54 as shown in FIGS. 1 and 5. The elongated slide track 20 is mounted to the outer body panel 18 such that it extends between the forward edge 52 and rear edge 54. A channel 60 can be formed in the outer surface 28 of the outer body panel 18 and can be recessed toward the inner body panel 16. The channel 60 can extend between the forward edge 52 and rear edge 54 of the outer body panel 18 at least the length of the elongated slide track 20 and can have a base surface 62 on which the elongated slide track 20 is mounted. The channel 60 is best seen in FIGS. 3 and 6.

Figure 6:
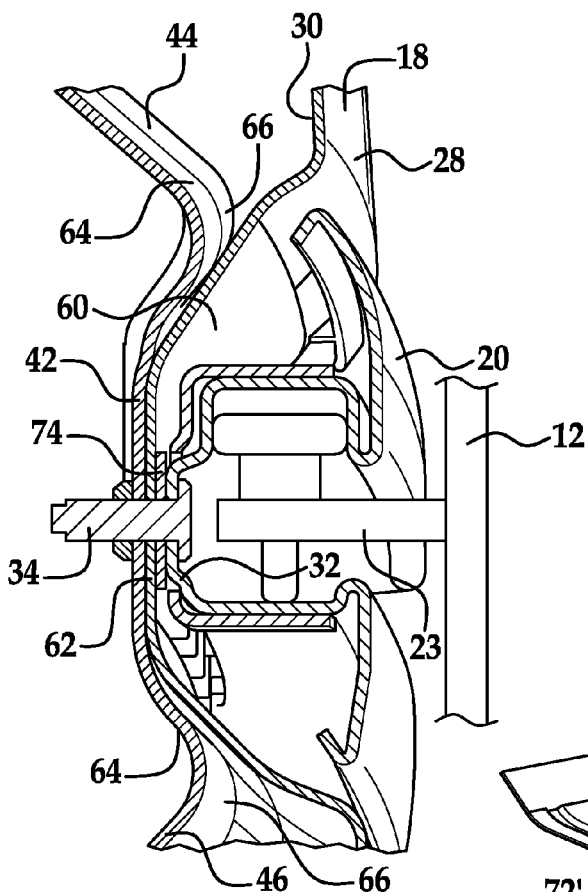
FIG. 6 is an enlarged side sectional view of a vehicle body assembly disclosed herein.

The support surface 42 of the force distribution member 40 can conform to the base surface 62 of the channel 60 and can directly contact the base surface 62 as shown in FIGS. 3 and 6. For example, the support surface 42 can mimic the size and/or shape of the channel 60 such that contact surface area between the force distribution member 40 and the outer body panel 18 is maximized. The support surface 42 is at least partially bounded by ridges 64 that extend from the support surface 42 in the outboard direction of the vehicle 10 such that distal ends 66 of the ridges 64 relative to the support surface 42 are located outboard of the base surface 62 of the channel 60. This is best seen in FIG. 6. As shown, the ridges 64 are on opposing sides of the support surface 42 between the support surface 42 and the respective first and second distribution legs 44, 46. One side of the ridge 64 can follow the contour of the channel 60 as shown but is not required to follow the contour. None, all or a portion of the side of the ridge 64 can contact the channel 60 depending on its contour.

The first and second distribution legs 44, 46 each extend from opposing edges of the support surface 42 at a non-orthogonal angle α. The angle α will vary depending on at least the length of the first and second distribution legs 44, 46 and the distance 26 between the inner body panel 16 and the outer body panel 18. The span 68 of the distribution legs 44, 46, or the distance between the first and second contact points 48 and 50, respectively, is substantially perpendicular to the length of the elongated slide track 20, best seen in FIG. 5. The span 68 of the distribution legs 44, 46 can also change depending on at least the distance 26 between the inner body panel 16 and the outer body panel 18. The span 68 and the angle α, as well as the length and width of the distribution legs 44, 46 can vary.

The first distribution leg 44 may be of a different length and/or has a different angle α from the second distribution leg 46. For example, as seen in FIGS. 3 and 5, the inner body panel 16 may be stepped in one or more places. The force distribution member 40 can span the step 70 of the inner body panel 16. In other words, the first contact point 48 between the first distribution leg 44 and the inner body panel 16 can be located inboard of the second contact point 50 between the second distribution leg 46 and the inner body panel 16. Alternatively, the second contact point 50 between the second distribution leg 46 and the inner body panel 16 can be located inboard of the first contact point 48 between the first distribution leg 44 and the inner body panel 16. The step 70 can alternatively be a gradual bend in the inner body panel 16. The inner body panel 16 can also be relatively flat such that the first and second contact points 48, 50 are in the same plane.

As shown in FIG. 5, the support surface 42 of the force distribution member 40 is positioned along the elongated slide track 20 proximate a rearmost end 21 of the elongated slide track 20. The location is provided as illustration and is not meant to be limiting. The force distribution member 40 can be located in any position along the elongated slide track 20. More than one force distribution member 40 can be placed along the elongated slide track 20 as desired or required.

The force distribution member 40 can include at least one rib embossment 72 that extends in a longitudinal direction of the force distribution member 40, as seen in FIG. 4. The rib embossment 72 can extend in the longitudinal direction along the first and second distribution legs 44, 46 and the support surface 42, or the rib embossment 72 can extend in the longitudinal direction along a portion of or all of the first and second distribution legs 44, 46 only. As a non-limiting example, the force distribution member 40 in FIG. 4 has both a rib embossment 72 that extends in the longitudinal direction along the first and second distribution legs 44, 46 and the support surface 42 and has a rib embossment 72' that extends in the longitudinal direction along only the first and second distribution legs 44, 46. The rib embossments 72, 72' provide added strength to the force distribution member 40 to assist in the load transfer from the outer body panel 18 to the inner body panel 16 when the slidable closure panel 12 is moved along the elongated slide track 20. For example, the rib embossments 72, 72' can resist compressive forces directed in an inboard direction of the vehicle from the outer body panel 18.

Embodiments of the vehicle body assembly can also include a washer 74 positioned between the base portion 62 of the channel 60 and the portion 32 of the elongated slide track 20, as shown in FIG. 6. The washer 74 can be made of foam or a similar material. The washer 74 dampens noise and vibration due to movement of the vehicle 10 and the slidable closure panel 12.

Figure 7:
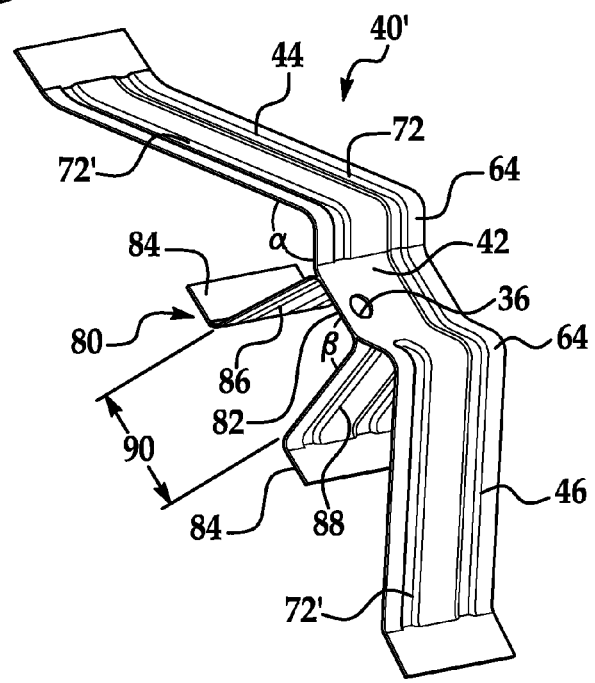
FIG. 7 is a perspective view of an alternative embodiment of a force distribution member as disclosed herein.

FIG. 7 illustrates an alternative embodiment of the force distribution member 40'. The force distribution member 40' is similar in many respects to force distribution member 40. Reference numbers will be repeated for identical elements. Force distribution member 40' comprises a support surface 42 and first and second distribution legs 44, 46. The support surface 42 has an aperture 36 for receiving the fastener 34. The support surface 42 can have one or more ridges 64, and the force distribution member 40' can have rib embossments 72 and 72' as described above. The force distribution member 40' further comprises a reinforcement bracket 80 having a first end 82 fixed to the support surface 42 of the force distribution member 40' and a second end 84 attachable to the inner body panel 16 by welding, adhesive, mechanical fastening or other methods known to those skilled in the art.

The first end 82 can have an aperture such as that in support surface 42 and can be attached to the support surface 42 with the same fastener 34 used to attach the support surface 42 to the outer body panel 18 and the elongated slide track 20. The first end 82 can be welded or attached to the support surface 42 by other means such as adhesives, with an aperture that aligns with aperture 36 of the support surface 42 to receive fastener 34.

As illustrated in FIG. 7, the reinforcement bracket 80 is located between the first and second distribution legs 44, 46 of the force distribution member 40'. The reinforcement bracket 80 has two second ends 84 for attachment to the inner body panel 16. First and second bracket legs 86 and 88, respectively, extend between the first end 82 and respective ones of the second ends 84. The span 90 of the bracket legs 86 and 88 is less than the span 68 of the first and second distribution legs 44, 46. For example, the span of the bracket legs 86 and 88 can be less than half of the span 68 of the distribution legs 44 and 46. However, longer or shorter spans are contemplated within the scope of the present invention. The bracket legs 86 and 88 of the reinforcement bracket 80 span the distance between the support surface 42 and the inner body panel 16 and can provide additional load transfer from the outer body panel 18 to the inner body panel 16 when the slidable closure panel 12 is moved along the elongated slide track 20.

The bracket legs 86 and 88 of the reinforcement bracket 80 each extend from opposing edges of the support surface 42 at one of an orthogonal or a non-orthogonal angle β. As illustrated in FIG. 7, angle β will typically be less than angle α. The angle β will vary depending on at least the length of the bracket legs 86 and 88 and the distance 26 between the inner body panel 16 and the outer body panel 18. The span 90 of the bracket legs 86 and 88, or the distance between second ends 84, is substantially parallel to the span 68 of the distribution legs 44 and 46. The span 90 can also change depending on at least the distance 26 between the inner body panel 16 and the outer body panel 18. However, the span 90 and the angle β, as well as the length and width of bracket legs 86 and 88 can vary as needed or desired.

The bracket legs 86 and 88 can be of equal length such that the angle β will be the same for each of the bracket legs 86 and 88 when the second ends 84 are fixed to the inner body panel 16 in the same plane. Bracket leg 86 may alternatively be of a different length and/or have a different angle β than bracket leg 88. The bracket legs 86 and 88 can be fixed to the inner body panel 16 in a plane equal to that of one or both of the first and second distribution legs 44, 46. The bracket legs 86, 88 can alternatively span a step 70 such as that shown in FIG. 5.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle body assembly for a vehicle comprising:
an inner body panel;
an outer body panel spaced a distance from the inner body panel in an outboard direction of the vehicle, the outer body panel having an outer surface and an opposing inner surface;
an elongated slide track mounted on the outer surface of the outer body panel; and
a force distribution member having a support surface fixed to the inner surface of the outer body panel directly opposite a portion of the elongated slide track and first and second distribution legs extending from the support surface and fixed to the inner body panel.

2. The vehicle body assembly of claim 1, wherein the elongated slide track is configured to support a vehicle door by receiving a protrusion on the vehicle door that slides within the elongated slide track, the elongated slide track guiding movement of the vehicle door relative to the outer body panel.

3. The vehicle body assembly of claim 1, wherein the outer body panel has a forward edge and an opposing rear edge and a channel formed in the outer surface and recessed toward the inner body panel, the channel extending between the forward edge and rear edge and having a base surface on which the elongated slide track is mounted.

4. The vehicle body assembly of claim 3, wherein the support surface of the force distribution member conforms to the base surface of the channel and directly contacts the base surface.

5. The vehicle body assembly of claim 3, wherein the support surface is at least partially bounded by a ridge that extends from the support surface in the outboard direction of the vehicle such that a distal end of the ridge relative to the support surface is located outboard of the base surface of the channel.

6. The vehicle body assembly of claim 3, wherein the first and second distribution legs of the force distribution member extend from the support surface to span the distance between the inner body panel and outer body panel.

7. The vehicle body assembly of claim 1, wherein the first and second distribution legs each extend from opposing edges of the support surface at a non-orthogonal angle.

8. The vehicle body assembly of claim 1, wherein a line extending the span of the distribution legs is substantially perpendicular to a direction in which the elongated slide rail extends.

9. The vehicle body assembly of claim 1, wherein a first contact point between the first distribution leg and the inner body panel is located inboard of a second contact point between the second distribution leg and the inner body panel.

10. The vehicle body assembly of claim 1, further comprising a reinforcement bracket having a first end fixed to the support surface of the force distribution member and a second end fixed to the inner body panel.

11. The vehicle body assembly of claim 10, wherein the reinforcement bracket is located between the first and second distribution legs of the force distribution member.

12. The vehicle body assembly of claim 1, wherein the force distribution member includes at least one rib embossment that extends in a longitudinal direction of the force distribution member.

13. The vehicle body assembly of claim 12, wherein the at least one rib embossment extends in the longitudinal direction only along the first and second distribution legs.

14. The vehicle body assembly of claim 1, wherein the support surface of the force distribution member is positioned proximate a rearmost end of the elongated slide track.

15. The vehicle body assembly of claim 1, further comprising a fastener extending through apertures in the elongated slide track, the outer body panel, and the support surface of the force distribution member to rigidly fix the force distribution member to the elongated slide track.

16. A vehicle comprising:
a slidable closure panel;
a fixed body panel comprising:
an inner body panel;
an outer body panel spaced a distance from the inner body panel in an outboard direction of the vehicle, the outer body panel having an outer surface and an opposing inner surface; and
an elongated slide track mounted on the outer surface of the outer body panel and configured to support the slidable closure panel; and
a force distribution member coupled between the inner and outer body panels and configured to transfer a force of the slidable closure panel from the outer body panel to the inner body panel.

17. The vehicle of claim 16, wherein the force distribution member has a support surface fixed to the inner surface of the outer body panel directly opposite a portion of the elongated slide track and first and second distribution legs extending from the support surface and fixed to the inner body panel.

18. The vehicle of claim 17, wherein the outer body panel has channel formed in the outer surface and recessed toward the inner body panel, the channel extending horizontally along the outer body panel and having a base surface on which the elongated slide track is mounted.

19. The vehicle of claim 18, wherein the support surface of the force distribution member conforms to the base surface of the channel and directly contacts the base surface.

20. The vehicle of claim 18, wherein the support surface is at least partially bounded by a ridge that extends from the support surface in the outboard direction of the vehicle such that a distal end of the ridge relative to the support surface is located outboard of the base surface of the channel.

* * * * *